United States Patent [19]
Breed

[11] Patent Number: 4,819,960
[45] Date of Patent: Apr. 11, 1989

[54] ANGLED VEHICLE CRASH SENSOR

[75] Inventor: David S. Breed, Boonton Township, Morris County, N.J.

[73] Assignee: Breed Automotive Technology, Inc., N.J.

[21] Appl. No.: 933,552

[22] Filed: Nov. 21, 1986

[51] Int. Cl.$^4$ .................... B60R 21/32; G01D 21/00
[52] U.S. Cl. ....................................... 280/734; 73/492
[58] Field of Search ...................... 280/728, 734, 735; 73/492; 116/203

[56] References Cited

U.S. PATENT DOCUMENTS

| | | | |
|---|---|---|---|
| 3,592,156 | 7/1971 | Prachar | 73/492 |
| 3,732,844 | 5/1973 | Heckendorf | 73/492 |
| 4,552,380 | 11/1985 | Stevens | 280/728 |
| 4,573,706 | 3/1986 | Breed | 280/734 |

FOREIGN PATENT DOCUMENTS

| | | | |
|---|---|---|---|
| 2755649 | 6/1978 | Fed. Rep. of Germany | 280/734 |
| 2711192 | 9/1978 | Fed. Rep. of Germany | 280/735 |

Primary Examiner—Charles A. Marmor
Assistant Examiner—Ross Weaver
Attorney, Agent, or Firm—Kane, Dalsimer, Sullivan, Kurucz, Levy, Eisele and Richard

[57] ABSTRACT

The sensor means crashes earlier and discriminates better when mounted at an angle to a horizontal plane passing through the horizontal axis of the vehicle. The sensor preferably is of the damped ball-in-tube type and the angular mounting thereof ranges from 10 to 40 degrees with respect to the horizontal axis of the vehicle, with the forward end of the sensor lower than the rear.

15 Claims, 8 Drawing Sheets

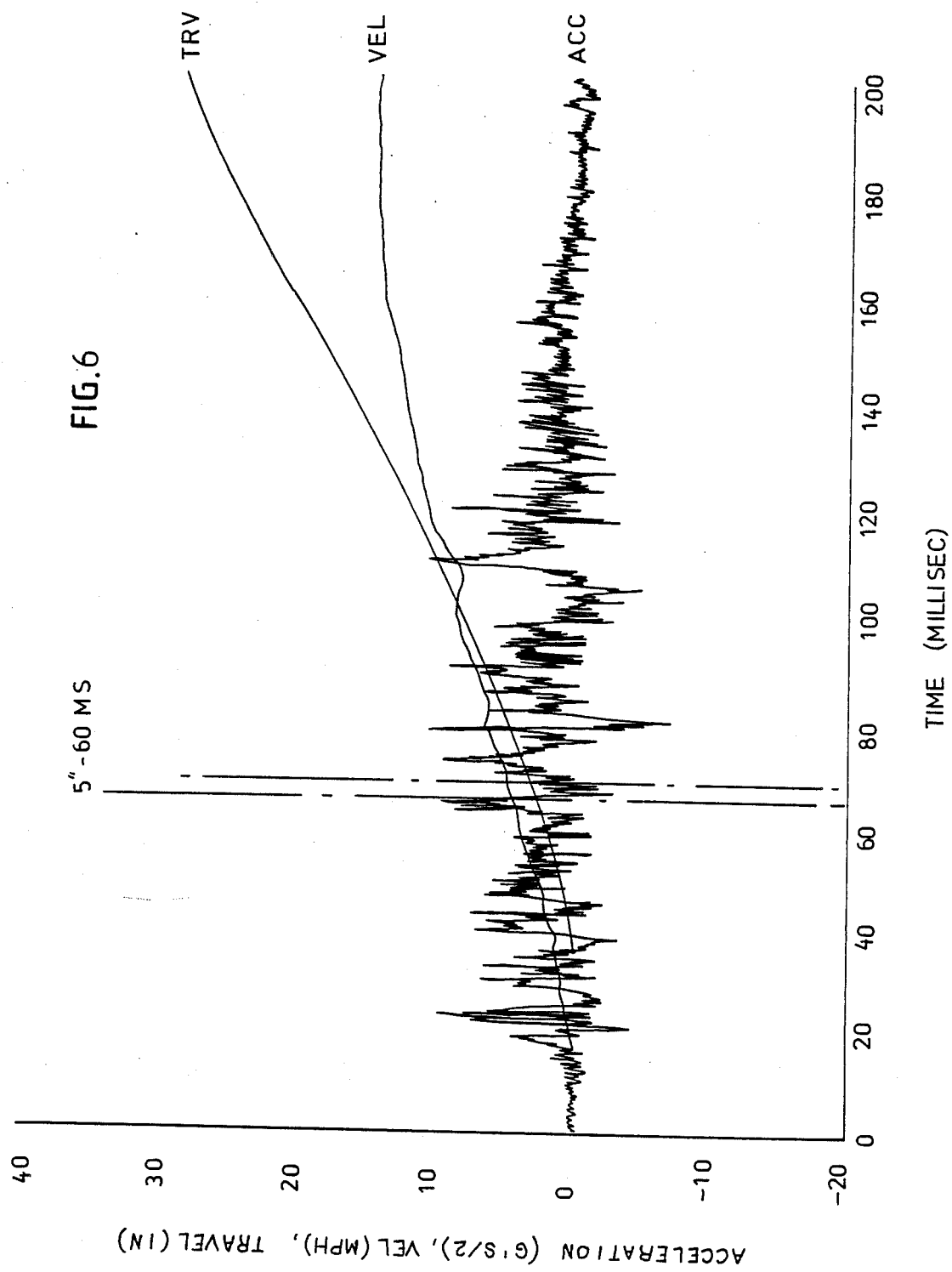

ANGLED VEHICLE CRASH SENSOR

BACKGROUND OF THE INVENTION

This invention relates generally to crash sensors for use in vehicles equipped with airbags. More specifically, the invention relates to the placing of the crash sensors.

The present invention also constitutes an improvement over co-assigned U.S. Pat. Nos. 4,284,863, 4,329,549, 4,573,706 and 4,580,810, the disclosure thereof being incorporated therein by reference in accordance with accepted legal principles.

U.S. Pat. Nos. 4,284,863 and 4,329,549 are damped ball-in-tube crash sensor designs.

In U.S. Pat. No. 4,573,706, there is disclosed and claimed a mechanical sensor with a low bias for mounting within a vehicle passenger compartment which is operable without electric power for igniting the pyrotechnic elements of an airbag safety restraint system where the sensor comprises a sensor train which includes a sensing mass, a spring bias, a firing pin and a primer; and means responsive to sustained acceleration primer and initiate airbag inflation.

U.S. Pat. No. 4,580,810 discloses and claims an airbag system adapted to be mounted on the axis of a steering wheel of a vehicle wherein the sensor is mounted inside an inflator for the airbag. This system includes an inflatable airbag; a gas generator having a housing and ignitable gas-generating material contained therein in fluid communication with the interior of the bag which is external to the housing. The system also includes ignition means for igniting the gas-generating material which is within the housing and a sensor also mounted within the housing of the gas generator for sensing the crash and initiating the ignition means.

It is known that when mounting a sensor on the steering column of a vehicle, the sensor normally rotates with the steering column and thus in order for the sensor to have the same orientation regardless of the angle of the steering column, the sensor axis must be parallel to the axis of the steering column. The inventor's research has shown that the steering column mounted sensors frequently fired earlier than other passenger compartment mounted sensors having the same calibration. This would found to be caused in some cases by the coupling of the steering column with the crush zone of the vehicle. In other cases, the steering column was not coupled with the crush zone but still the sensor fired early; the crush zone being that portion of the vehicle which experiences a velocity change early in the crash before the entire vehicle has slowed down. The inventor's study concluded that placing a crash sensor at an angle to the horizontal makes it additionally more sensitive due to the vertical acceleration components present in a vehicle crash.

INFORMATION DISCLOSURE STATEMENT

Prior publications as exemplified by U.S. Pat. Nos. 2,649,311; 3,563,024; 3,859,650; 4,116,132; 4,167,276; 4,172,603; 4,161,228; and 4,204,703 are generally illustrative of various systems of this type.

Very pertinent to this invention are the co-assigned patents mentioned above.

In the general appreciation of the prior-described device, it can be said that these are often acceptable for their intended purposes, but they are not entirely satisfactory for a number of reasons, in particular because of their failure to fire as rapidly as would be desired and their ability to distinguish between airbag-desired and airbag-not-desired crashes. There is continuing research in ways and means to accelerate such firing and improve the crash discrimination ability of the sensors.

SUMMARY OF THE INVENTION

An object of the present invention is to provide an angled passenger compartment sensor which fires earlier than prior art passenger compartment-mounted sensors, owing to the angular mounting thereof relative to the of the vehicle equipped therewith.

A second object of the present invention is to provide an angled crush zone sensor which fires earlier than prior art crush zone mounted sensors owning to the angular mounting thereof relative to the of the vehicle equipped therewith.

Another object is to provide a sensor which possesses a low bias and is responsive to velocity changes which require the acceleration to be sustained for an extended period.

Another object of the invention is to provide a mechanical or electronic sensor that is responsive to a portion of the vertical acceleration components of a vehicle crash.

Another object of this invention is to provide a system of this character which combines simplicity, strength and durability in a high degree together with inexpensiveness of construction and facile mounting.

Other objects of this invention will in part be obvious and in part hereinafter pointed out.

This invention resides in the concept of mounting a sensor at an angle to a horizontal plane passing through the vehicle for which it is designed. Preferably, the angle of mounting of the sensor ranges from 10 to 40 degrees with respect to the horizontal. A preferred range for the optimum angle of mounting is between 20 and 30 degrees. The exact angle will vary from car to car and for different mounting locations and must be determined on a case by case basis.

BRIEF DESCRIPTION OF THE DRAWINGS

In the accompanying drawings in which are shown three of the various possible illustrative embodiments of the invention as well as performance curves illustrating an obvious nature of the invention, and wherein like reference characters identify the same or like parts.

FIG. 6 shows the acceleration measured at the tunnel of the target vehicle in a 45 mph, vehicle to vehicle, A-pillar impact crash.

On each of these plots the acceleration has been integrated first to give the velocity change (labeled VEL) and a second time to give the displacement (labeled TRV) of the tunnel relative to a coordinate system which continues to move at the pre-crash velocity. In addition, the required sensor firing time is indicated when appropriate and the time this invention would fire. Collectively, these curves demonstrate that placing a properly calibrated sensor on angle permits discrimination between these two crashes.

DETAILED DESCRIPTION

Figure 1:
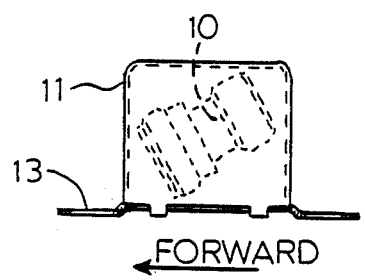
FIG. 1 is a cross-sectional view of the invention with an electric switch type sensor such as used in the crush zone mounted at a 30 degree angle with respect to the horizontal.

In the drawings FIG. 1 shows a sensor (10) mounted within a housing (11). The housing is defined with one wall thereof constituting bracket 13. As shown the sensor is incline at 30 degrees from a horizontal plane of the vehicle. The bracket (13) is adapted to be installed on a vehicle.

Figure 2:
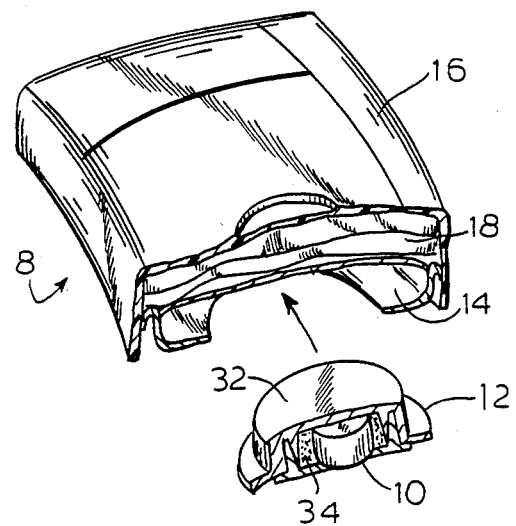
FIG. 2 is an exploded perspective view of a mechanical sensor airbag system with certain parts broken away and removed.

In the embodiment shown in FIG. 2, an airbag safety restraint system (8) incorporating a sensor (10) is mounted inside the gas generator inflator (12). The inflator (12) is symmetrically mounted on a frame (14) to which is also mounted the housing or cover (16) for the folded airbag (18). The airbag housing or cover (16) is made of a frangible plastic material and encloses and protects the folded airbag (18) to prevent damage to the bag when it is stored and in its uninflated condition.

The airbag safety restraint system (8) can be mounted through its frame (14) anywhere in the passenger compartment but at an angle between 10 and 40 degrees to the horizontal axis of the vehicle. This is done by either inclining the housing (16) downward within that angular range or by placing sensor (10) which then is secured by its frame (14) parallel to the horizontal axes of the vehicle.

As is customary, the gas generator (12) includes a housing (32) containing a gas generating material which suitably is sodium azide which is suitable over a wide range of temperatures but which when ignited, decomposes, rapidly releasing a large volume of nitrogen gas.

Figure 3:
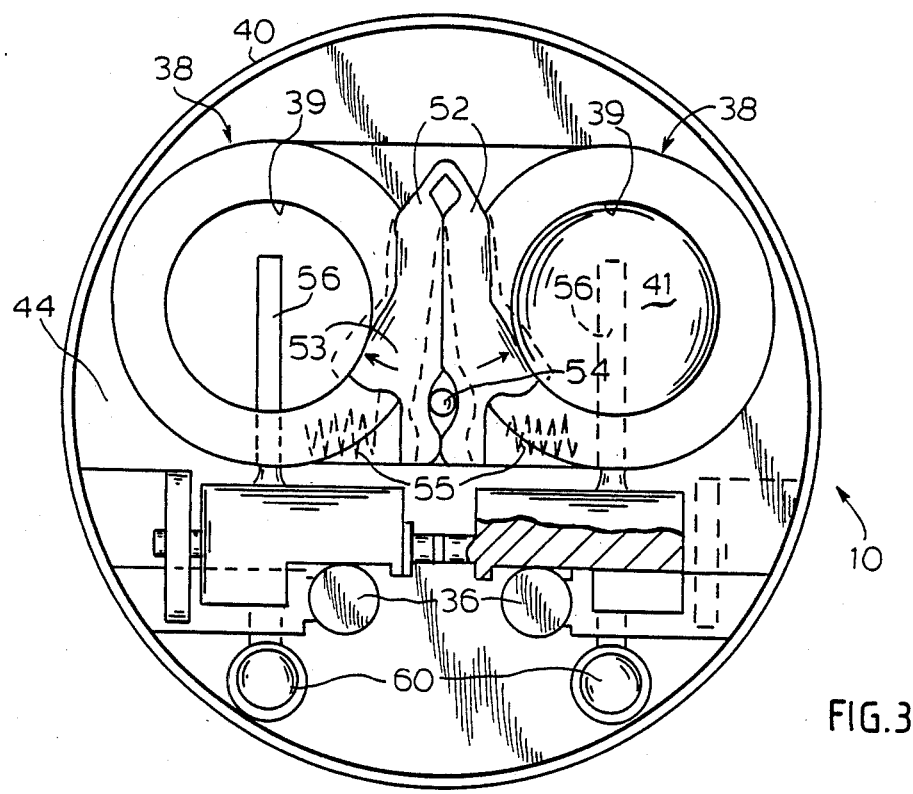
FIG. 3 is a side elevational view of a sensor for use with the invention with certain parts broken away and removed.

Reference is now made to the sensor initiator (10) shown in detail in FIG. 3. In order to increase reliability a pair of redundant damped sensors (38) are adapted to actuate respective primers (36) within the housing (40). Each sensor (38) contains a damped sensing mass (41) capable of limited movement within the cylinder (39) in the block (44) contained within the housing (40). Before the airbag safety system is mounted in the passenger compartment, movement of the mass (41) within the respective cylinder (39) is prevented by means hereinafter described. An extension not shown which is part of a device mounted in the passenger compartment enters a lock pin hole in the sensor initiator (10). The pin extension shifts the conical lock pin permitting the sensing mass lock arms (52) to rotate out of the path of the sensing mass (41) thereby arming the system.

The locking arms (52) have a common connection and operate under the bias of springs (55) which urge the arms towards one another. The arms are kept apart and consequently in engagement with the sensing masses (41) to prevent movement of the sensing masses (41) as a result of the conical pin (54) when it is engaged with the arms (52) to thereby keep them apart and consequently in engagement with the sensing masses (41). When the pin (54) is moved inwardly the smaller diameter of the conical shape of the lock pin (54) is exposed to the arms which then under the influence of the springs (55) are moved towards one another to thereby free the sensing masses (41). The inward movement of the conical pin (54) is caused by an external arming pin which is attached to the vehicle where this airbag module is to be mounted.

Figure 4:
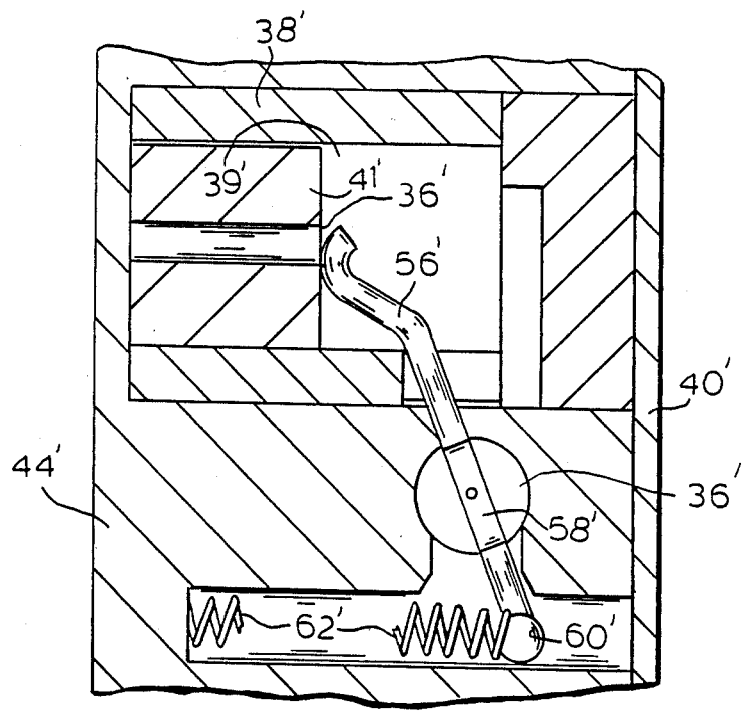
FIG. 4 is an enlarged fragmentary view of the sensor showing the sensing mass and the lever extending from D-shaft prior to movement of the mass incident to a crash.

Each sensing mass (41) is associated with a pin (56) extending from a "D-shaft" (shown in FIG. 4 as 58'). The other end of the pin (56) includes the spherical ball (60) engagement with a spiral biasing spring (62) shown as spring 62' in FIG. 4 to assure the interengagement of pin (56) with its associated sensing mass (41) and to provide the proper bias against motion of the sensing mass. Each D-shaft (58) is provided with a suitable surface formed in a generally cylindrical shaped surface. In addition, a spring biased firing pin is placed in alignment with the primer (35) and is maintained in its retracted position by the cylindrically shaped portion of the D-shaft (58). It is permitted to be released when aligned with the face of the shaft.

In FIG. 4, a pure spring mass sensor is shown having an essentially undamped sensing means (41') which normally will travel a longer distance than in the case of damped spring mass sensors. In all other respects, this sensor initiator is the same as sensor initiator (10) of FIG. 3 and like numerals were used with accompanying primes for the corresponding parts.

It is also possible to use a damped spring mass sensor where the dampening is created by a sharp edge orifice in the piston such as is disclosed in U.S. Pat. No. 3,563,024.

Figure 5:
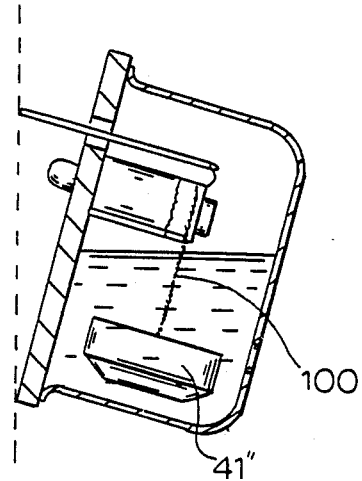
FIG. 5 is a partial sectioned view of an electronic sensor with the sensing mass mounted at a 20 degree angle.

In FIG. 5 an electronic sensor is illustrated wherein the sensing mass (41") is shown placed on an angle in the sensor. This sensor is suitable for mounting on the tunnel of a vehicle in conjunction with the electronic diagnostic circuits. The motion of the sensing mass (41") causes the electrical strain gauges 100 to change in portion to the acceleration of the sensing mass. This resistance is part of an electronic circuit 101 which responds to the resistance change to determine the severity of the accident and thus to initiate an airbag inflation when desirable. In another configuration the stain gauge system can be replaced by a Piezo electric crystal. In this case, the electronic circuit monitors the output from the Piezo electric crystal instead of the stran gauge resistance. The electronic sensor shown here differs from known electronic sensor primarily in the fact that the sensing mass is placed at an angle with respect to a horizontal plane of the vehicle.

With respect to all the types of sensors incorporating the teachings of the invention, it is to be noted that their operation is improved by being mounted angularly and downwardly in the passenger compartment.

Referring now to the graphs of FIGS. 6 through 10, it will be clear therefrom that the mounting of a crash sensor on a downward angle is desirable.

A ball-in-tube crash sensor has one uncontrollable degree of freedom which is the location of the ball in the cylinder. If the ball goes down the center of the cylinder without touching a side, then it will take a considerably larger velocity change for the ball to travel a given distance than if the ball is resting against the side. This is due to the fact that the air flow restriction is proportional to 2.5 power of the clearance. If the clearance has a crescent shape such as would be the case when the ball is against the side of the cylinder, it can be demonstrated mathematically that the flow resistance is approximately half of the resistance when the clearance has a circular or ring shape. Moreover, if the ball is allowed to whirl around inside the tube, energy will be dissipated in the form of friction which will similarly downgrade the performance of the sensor particularly for marginal crashes. For car sensors, therefore, it is desirable to mount the sensors of an angle so that there is a predominant acceleration vector component holding the ball against one side of the cylinder.

In distinguishing between certain types of crashes which are characterized by long pulses, it has been found that vigorous crashes such as high speed car-to-car A-pillar impacts have a substantial vertical acceleration component, whereas non-vigorous crashes such as 9 mph frontal barrier impacts, for example, do not have a significant vertical component. When sensors are mounted horizontally, they cannot distinguish between these two crashes. It was found, unpredictably and unexpectedly, that when they are mounted on an angle pointing downward, the resultant acceleration which is composed of both vertical and horizontal components renders the two crashes distinguishable. This is readily apparent from the curves of FIGS. 6 through 11.

Figure 7:
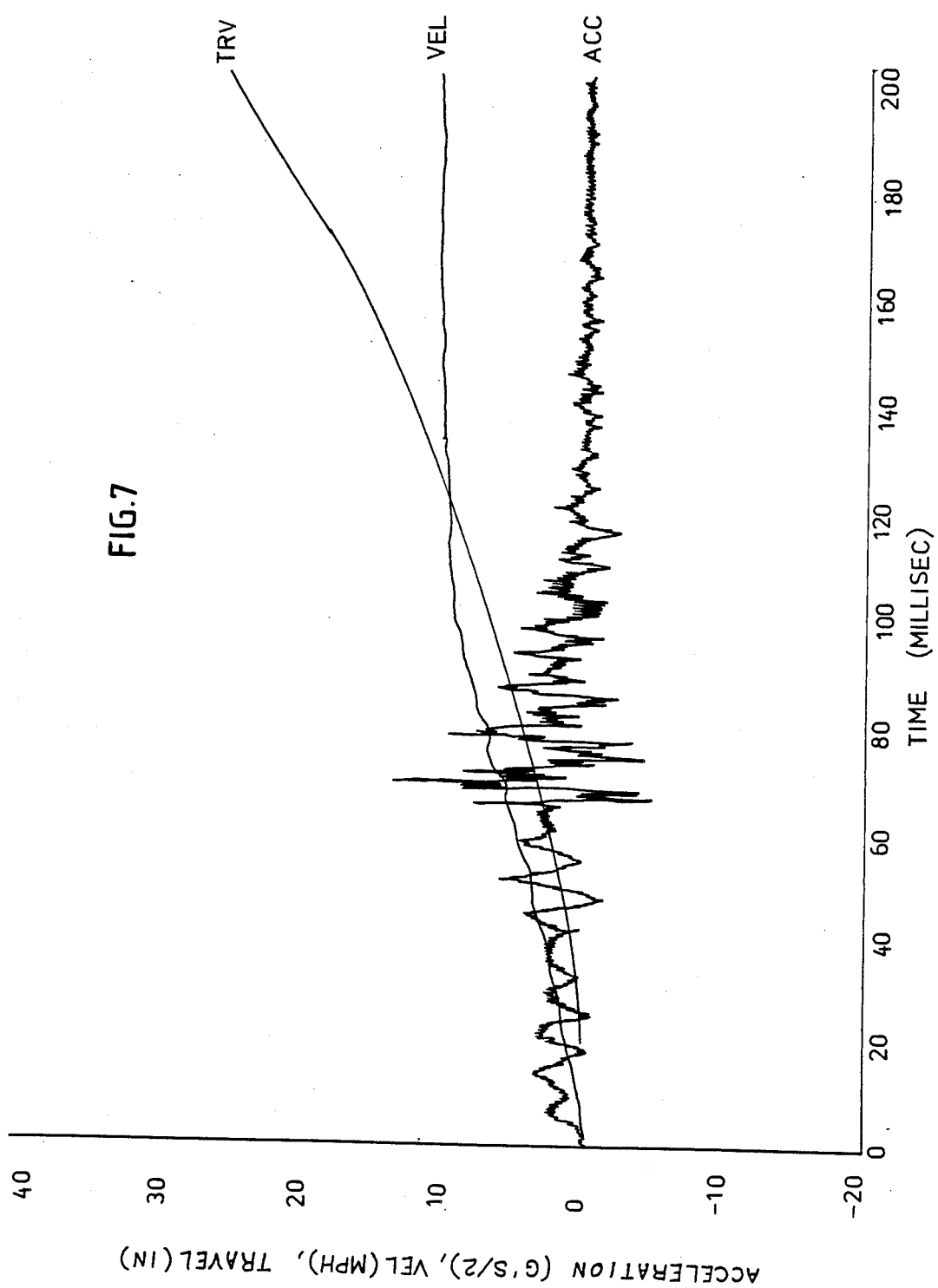
FIG. 7 shows the acceleration taken at the tunnel of a vehicle involved in a 9 mph, frontal barrier impact.
Figure 8:
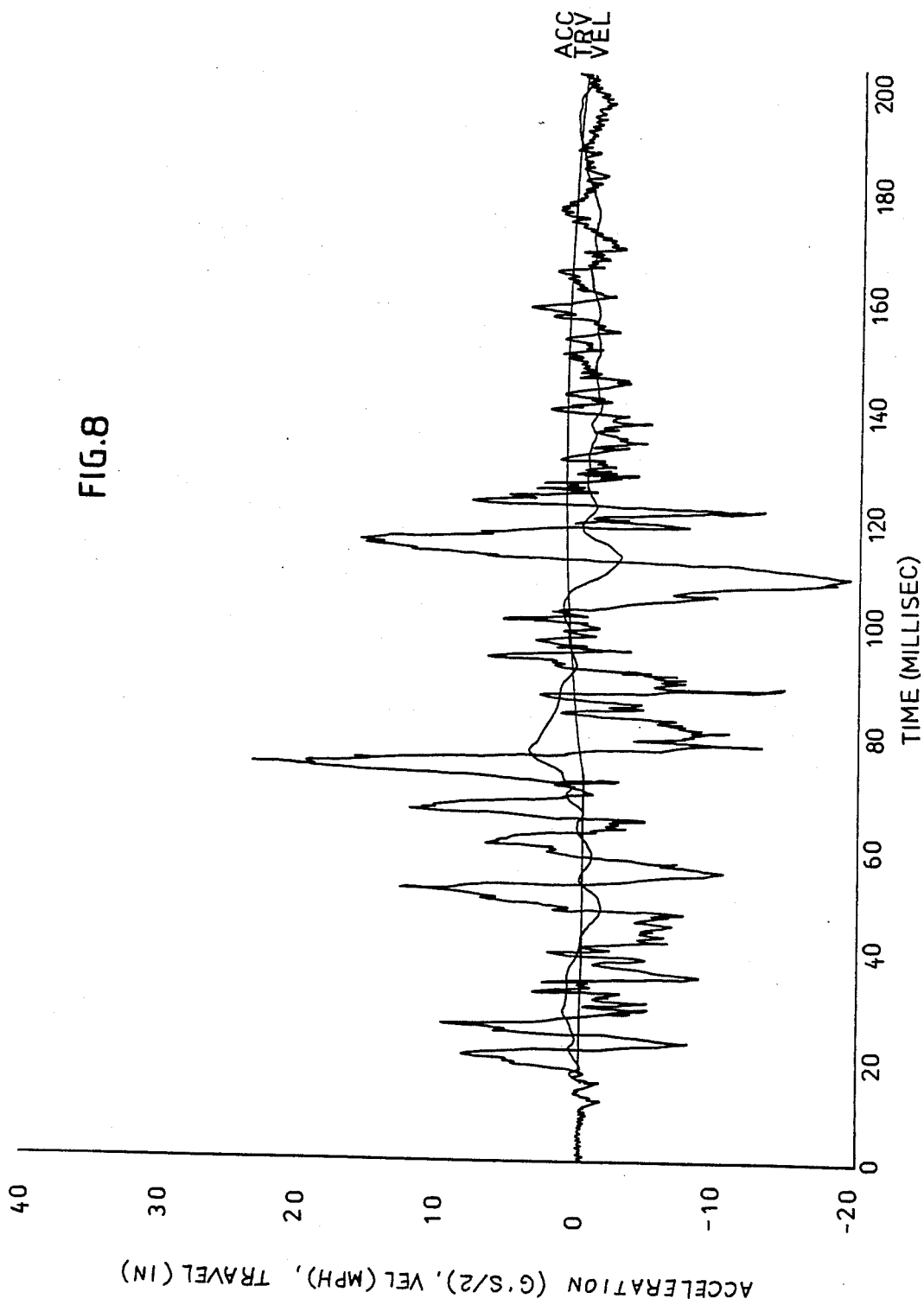
FIG. 8 shows the vertical acceleration for the same impact as shown in FIG. 6.
Figure 9:
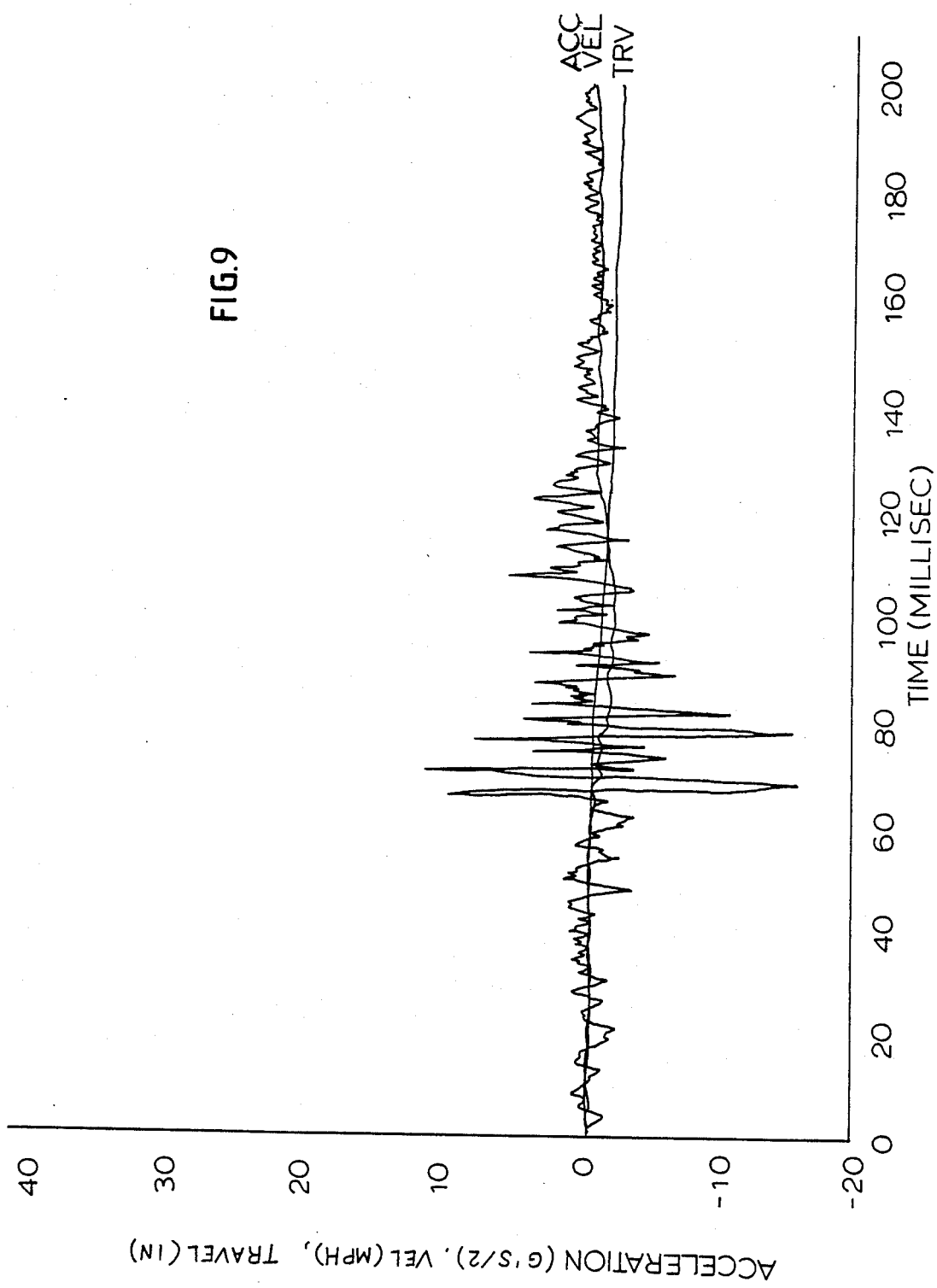
FIG. 9 shows the vertical acceleration for the same impact as shown in FIG. 7.
Figure 10:
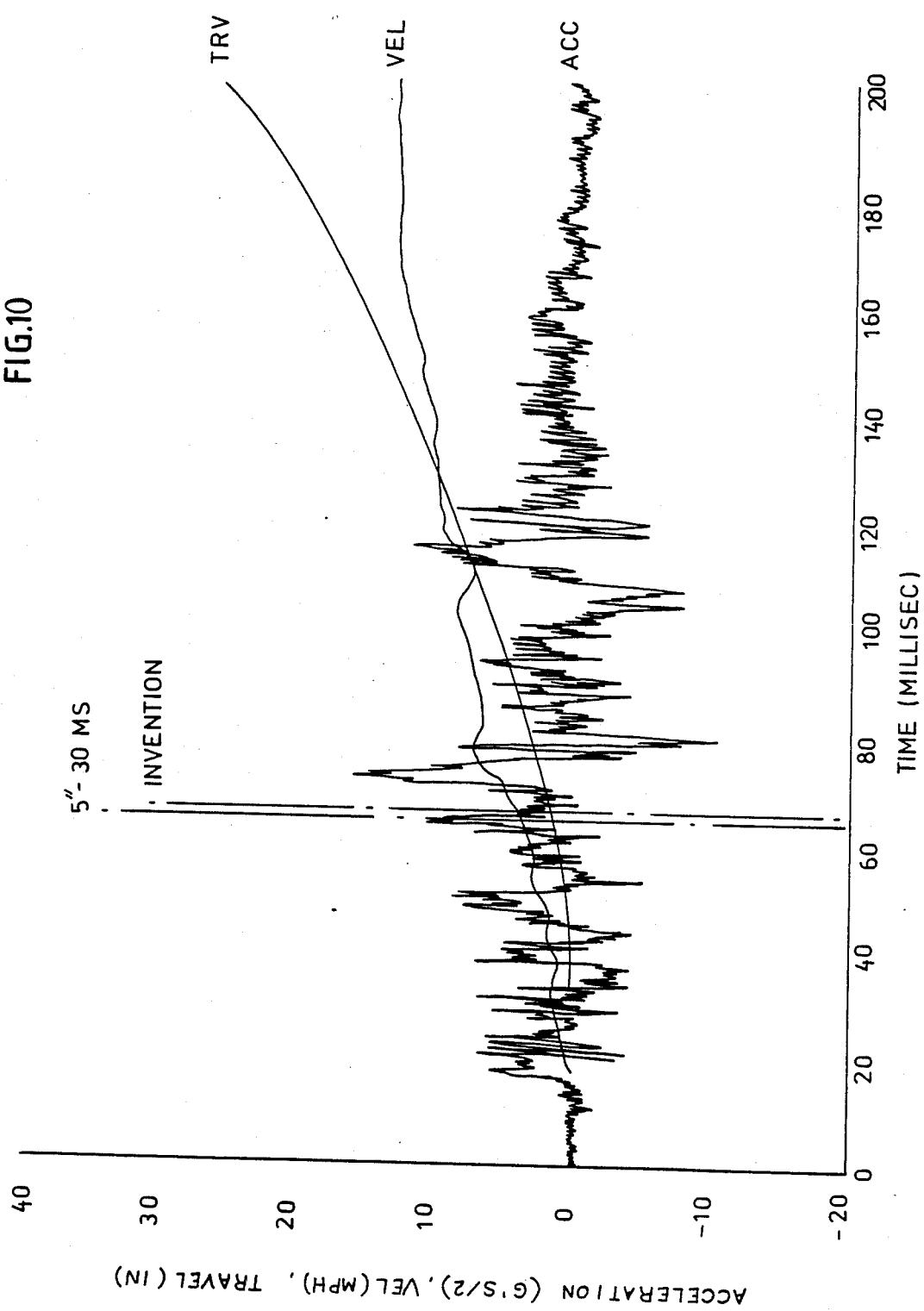
FIG. 10 shows the acceleration for the case of FIGS. 6 and 9 resolved about an axis rotated 24 degrees downward with respect to the horizontal plane.

The two crashes which are plotted in FIGS. 6 through 11 are respectively 45 mph car-to-car 30 degree A-Pillar impact where the car studied is a target car; and a 9 mph frontal barrier impact. By overlaying the plots of FIGS. 6 and 7, it will be noted that the velocity curves are essentially indistinguishable after allowing for Five millisecond delay in the A-pillar impact. This indicates that it would be extremely difficult or impossible to design a crash sensor which would fire on the A-pillar impact and not fire on the 9 mph barrier impact. FIGS. 6 and 7 show the horizontal acceleration components of the two crashes where the accelerometers are located on the vehicle transmission tunnel. In each curve the acceleration has been integrated to give the velocity change of the tunnel relative to a coordinate system moving at the pre-crash velocity. The velocity curves are marked VEL. The firing times of a sensor designed for this location is shown in FIG. 10 at about 65 milliseconds for the A-Pillar impact. It did not fire on the 9 mph barrier impact of FIG. 11.

Figure 11:
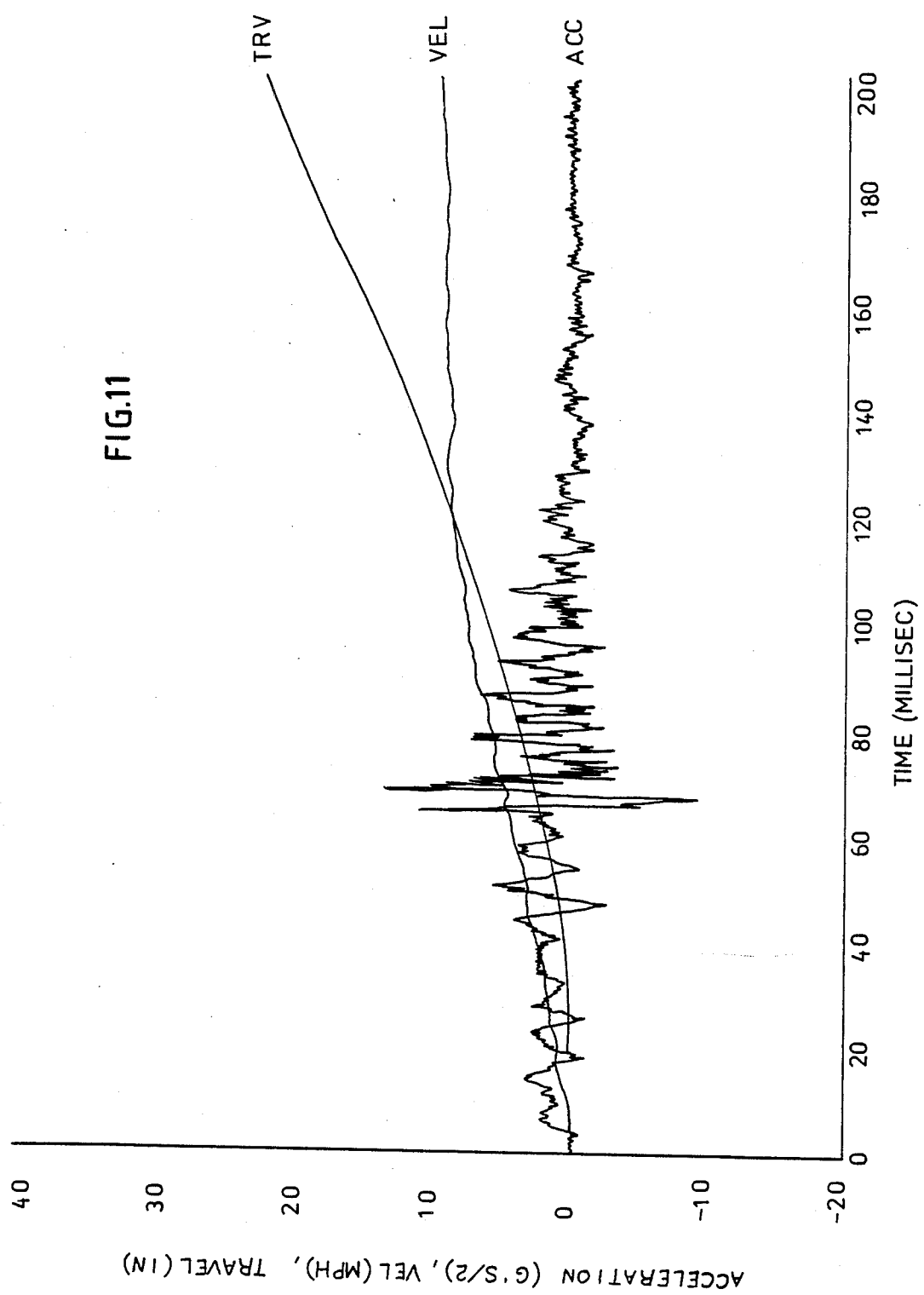
FIG. 11 shows the acceleration of FIGS. 7 and 9 resolved about an axis rotated 24 degrees downward with respect to the horizontal plane.

FIGS. 8 and 9 show the vertical accelerations for the same two crashes at the same location. Whereas the horizontal accelerations and velocities were very similar for these two cases, the vertical accelerations and velocities are markedly different. Thus, if the sensor was rotated so that it was sensitive to a portion of the vertical acceleration components as well as most of the horizontal acceleration components a sensor could be designed which would distinguish between these two crashes. This is illustrated in FIGS. 10 and 11, where the acceleration resolved about an axis which has been rotated 24 degrees relative to a horizontal plane is shown. If these two plots are overlayed, one will note that the velocity curve for the 9 mph barrier impact is virtually unchanged, whereas the velocity curve for the A-Pillar impact shows a marked oscillation. In fact, the A-Pillar impact velocity curve is much steeper in the period from 50 to 75 milliseconds than is the velocity curve on the 9 mph impact.

Research by the inventor has shown that the sensor should be pointed downward, rather than angularly upward to gain maximum improvement in firing response. Thus, the sensor fired in 65 milliseconds when rotated downward 24 degrees, but did not fire until 89 milliseconds when rotated upward by 30 degrees. This was totally unexpected to one skilled in the art.

When mounting a sensor on the steering wheel of the vehicle as disclosed and claimed in U.S. Pat. No. 4,580,810, the sensor normally rotates with the steering wheel and thus in order for the sensor to have the same orientation regard be parallel to the axis of the steering column. It has been noted that the mounted on an angle on the tunnel of the automobile also experienced earlier firing time. The study of the plots of acceleration data on the two particular vehicle crashes described above led to an understanding of this phenomenon. As shown in the FIGS. 6 through 11, the two crashes in question were at 45 mph, 30 degree angle, car-to-car crash where the bullet car struck a target car at the A-Pillar. The vehicle of interest was the target car. Since the front of the car missed in this crash, the sensor closure time for the crush zone sensors is late. The crash therefore, must be sensed by a passenger compartment mounted sensor. The second crash of interest is a 9 mph frontal barrier which the automobile manufacturer does not want the sensor to fire. When any sensor is mounted parallel with the axis of the vehicle the sensor would fire late on the A-Pillar crash and also fire on the 9 mph crash. If the sensor is designed so that it misses the 9 mph crash, it is even later on the A-Pillar crash. And similarly, if the sensor is designed to fire on time for the A-Pillar crash it fires even earlier on the 9 mph crash.

However, when the sensor is placed on a 24 degree angle, the opposite occurs. A sensor can easily be designed which does not fire on the 9 mph crash but fires in plenty of time on the A-Pillar crash. When a sensor is placed on a 24 degree angle as in FIGS. 10 and 11, it is sensitive to 41 percent (SIN 24°) of the vertical velocity change and loses only 9 percent (1-COS 41) of the horizontal velocity change. In the A-Pillar crash, there is a substantial oscillating vertical velocity change component. This, when superimposed on the longitudinal velocity change, causes the resultant to also oscillate. The sensor then fires on one of the peaks of the combined velocity change oscillation. On the 9 mph crash on the other hand, there is no such significant vertical velocity change and thus placing the sensor on an angle does not increase its sensitivity to this crash.

Although a passenger compartment mounted system has been described herein, it is obvious that many of the advantages of this invention would also apply to a crush zone sensor system.

By indicating that the sensor is to be pointed downwardly, it is understood that it is the front, or part closest to the front of the vehicle, of the sensor that is meant.

Although a system for an automobile has been described herein, it is obvious that the advantages of this invention would apply to the protection of operators and passengers of other types of vehicles, since by the term "vehicle" as used herein, it is intended to include trucks, boats, airplanes, and trains.

Airbags are particularly effective in preventing injuries to occupants for frontal impacts. They are also effective for side impacts when the target car experiences a substantial longitudinal velocity change and the occupants would, therefore, be injured by striking the windshield, steering wheel, or instrument panel. In a recent study by a major automobile manufacturer it was estimated that five percent of all accidents where airbags could be of significant help in preventing death and reducing injury were side impacts typified by the 45 mph, 30 degree A-Pillar impact described herein. It is generally accepted among auto companies that it is undesirable to fire an airbag on a low speed impact typified by a 9 mph frontal barrier impact. Heretofore, as shown in FIGS. 6 and 7, it has been impossible to distinguish between these two crashes since all crash sensors to date except those mounted on the steering wheel have been pointed in a horizontal direction.

Naturally, the advantage of utilizing the vertical acceleration components in conjunction with the horizontal acceleration components could be realized through the use of two accelerometers in an appropriate electronic circuit. The invention described herein relates to the use of the vertical acceleration components present in a vehicle crash to permit discrimination between airbag desired and airbag not desired crashes. Sensors have been placed on steering columns, and thus are more sensitive to the vertical acceleration components. The fact that this improved the discrimination ability and the response time of the sensor was not known, and thus all other crash sensors in the vehicle have always been placed with their sensitive axises in the horizontal plane.

Thus the forenoted objects and advantages of the invention are most effectably attained. Although several somewhat preferred embodiments have been disclosed and described in detail herein, it should be understood that this invention is in no sense limited thereby, and its scope is to be determined by that of the appended claims.

What is claimed is:

1. A safety restraint system for a vehicle, comprising a sensor, means for mounting said sensor on the vehicle other than on the steering wheel and means for mounting said sensor angularly with respect to horizontal plane, thereby said sensor being responsive to horizontal and vertical components of acceleration.

2. System according to claim 1 further comprising an inflatable airbag; inflation means for inflating the bag, said sensor being adapted to sense a crash to activate said inflation means.

3. System according to claim 1 including an inflatable airbag; a gas generator having a housing; an ignitable gas generating material contained therein and in fluid communication with the interior of the bag; ignition means for igniting the gas generating material said ignition means being within said gas generating housing and a sensor mounted angularly and downwardly in the passenger compartment for sensing the crash and initiating the ignition means.

4. System according to claim 1 wherein the sensor includes redundant means for sensing the crash and causing ignition of the ignition means.

5. System according to claim 1 wherein said sensor is mounted downwardly and angularly at an angle of about 10 to about 40 degrees from the horizontal.

6. System according to claim 1 wherein said sensor is mounted downwardly and angularly at an angle of 10 to 30 degrees to the horizontal.

7. A mechanical sensor with low bias for mounting within a vehicle passenger compartment and operable without electrical power for igniting the pyrotechnic element of an airbag safety restraint system for the vehicle, said sensor comprising a sensor train which includes:
   a primer;
   a spring biased firing pin;
   a means responsive to sustain acceleration above the bias for firing pin to strike the primer;
   said sensor being mounted downwardly and angularly with respect to the horizontal axis of said vehicle, thereby said sensor being responsive to horizontal and vertical components of acceleration.

8. A safety restraint system for a vehicle containing an electronic sensor comprising a sensing mass; means responsive to the motion of the sensing mass; said sensing mass being tilted thereby being sensitive to vertical as well as horizontal acceleration components.

9. The invention in accordance with claim 8 wherein the response means utilizes strain gauges.

10. The invention in accordance with claim 8 wherein the response means comprises a Piezo electric crystal.

11. A safety restraint system for a vehicle comprising a non-steering wheel mounted tilted sensor thereby having means responsive to vertical as well as horizontal acceleration components.

12. A safety restraint system for a vehicle comprising an electronic sensor, the sensor being tilted thereby having means responsive to vertical as well as horizontal acceleration components.

13. The invention in accordance with claim 12 wherein the sensor is mounted on the vehicle steering wheel.

14. A crash sensor for initiating an inflatable restraint comprising of:
   a sensing mass;
   a spring biasing the sensing means;
   a means responsive to sustain acceleration above the sensing mass bias to release the firing pin to strike the primer;
   said sensor being mounted downwardly and angularly with respect to a horizontal plane of said vehicle, thereby said sensor being responsive to horizontal and vertical components of acceleration.

15. A safety restraint system for a vehicle comprising:
   a sensor mounted in a housing downwardly and angularly with respect to said housing and angularly with respect to a horizontal plane;
   said housing lying substantially along the horizontal axis of said vehicle and mounted other than on a steering wheel.

* * * * *